US010969637B2

(12) United States Patent
Chen

(10) Patent No.: US 10,969,637 B2
(45) Date of Patent: Apr. 6, 2021

(54) ELECTROSTATIC DISCHARGING CIRCUIT AND DISPLAY PANEL

(71) Applicants: HKC Corporation Limited, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/632,320

(22) PCT Filed: Dec. 13, 2017

(86) PCT No.: PCT/CN2017/115806
§ 371 (c)(1),
(2) Date: Jan. 17, 2020

(87) PCT Pub. No.: WO2019/015236
PCT Pub. Date: Jan. 24, 2019

(65) Prior Publication Data
US 2020/0166811 A1    May 28, 2020

(30) Foreign Application Priority Data
Jul. 21, 2017    (CN) .......................... 201710605496.9

(51) Int. Cl.
*G02F 1/1362* (2006.01)
*G02F 1/133* (2006.01)
*G09G 3/36* (2006.01)

(52) U.S. Cl.
CPC .... *G02F 1/136204* (2013.01); *G02F 1/13306* (2013.01); *G09G 3/3677* (2013.01); *G09G 3/3688* (2013.01); *G09G 2310/0251* (2013.01)

(58) Field of Classification Search
CPC ........... G02F 1/136204; G02F 1/13306; G02F 1/133; G09G 3/3677; G09G 3/3688; G09G 2310/0251; G09G 2330/04; G09G 3/3648
See application file for complete search history.

(56) References Cited

U.S. PATENT DOCUMENTS

| 10,269,788 B2 * | 4/2019 | Cheng ................... H01L 27/124 |
| 2003/0146474 A1 * | 8/2003 | Ker ..................... H01L 27/0262 |
| | | 257/347 |

(Continued)

FOREIGN PATENT DOCUMENTS

| CN | 102118024 A | 7/2011 |
| CN | 102655145 A | 9/2012 |

(Continued)

OTHER PUBLICATIONS

International Search Report (with English translation) and Written Opinion dated Apr. 18, 2018 issued in corresponding Application No. PCT/CN2017/115806.

*Primary Examiner* — Chad M Dicke
(74) *Attorney, Agent, or Firm* — Muncy, Geissler, Olds & Lowe, P.C.

(57) ABSTRACT

An electrostatic discharge circuit and a display panel are provided. The electrostatic discharge circuit comprises a first discharge unit and an associated discharge unit. An output terminal of the first discharge unit is coupled to a common terminal. A control terminal of the first discharge unit is coupled to a high voltage terminal or a low voltage terminal. An input terminal of the first discharge unit is coupled to an electrostatic input terminal. An input terminal of the asso- (Continued)

ciated discharge unit is coupled to the electrostatic input terminal, and an output terminal of the associated discharge unit is coupled to the control terminal of the first discharge unit.

16 Claims, 3 Drawing Sheets

(56) References Cited

U.S. PATENT DOCUMENTS

| | | | | |
|---|---|---|---|---|
| 2004/0264080 | A1* | 12/2004 | Yang | H02H 9/046 361/56 |
| 2005/0127369 | A1* | 6/2005 | Toya | H01L 27/12 257/72 |
| 2006/0119757 | A1* | 6/2006 | Tsao | G02F 1/136204 349/40 |
| 2007/0091218 | A1 | 4/2007 | Huang et al. | |
| 2007/0146564 | A1* | 6/2007 | Wu | G02F 1/136204 349/40 |
| 2008/0165301 | A1* | 7/2008 | Chang | G02F 1/13452 349/40 |
| 2009/0141202 | A1* | 6/2009 | Yoshida | G09G 3/3648 349/38 |
| 2009/0174975 | A1* | 7/2009 | Huang | G09G 3/3648 361/56 |
| 2011/0285690 | A1* | 11/2011 | Li | G09G 3/20 345/212 |
| 2013/0214277 | A1* | 8/2013 | Kim | H01L 27/12 257/59 |
| 2013/0314139 | A1* | 11/2013 | Umezaki | G02F 1/13624 327/208 |
| 2014/0071109 | A1* | 3/2014 | Tseng | H02H 9/041 345/211 |
| 2014/0126093 | A1* | 5/2014 | Duan | G02F 1/136204 361/56 |
| 2014/0126094 | A1* | 5/2014 | Duan | G09G 5/00 361/56 |
| 2014/0192444 | A1* | 7/2014 | Wu | H02H 3/046 361/56 |
| 2014/0240889 | A1* | 8/2014 | Zheng | H05F 3/02 361/220 |
| 2015/0001626 | A1* | 1/2015 | Sokabe | H01L 27/0266 257/357 |
| 2015/0160522 | A1* | 6/2015 | Wu | G02F 1/136204 349/40 |
| 2016/0238911 | A1* | 8/2016 | Yoshii | G02F 1/136204 |
| 2016/0322019 | A1* | 11/2016 | Du | G09G 5/003 |
| 2017/0221417 | A1* | 8/2017 | Jung | G09G 3/20 |
| 2018/0052372 | A1* | 2/2018 | Xu | G09G 3/36 |
| 2018/0061825 | A1* | 3/2018 | Hao | H01L 27/0266 |
| 2018/0342864 | A1* | 11/2018 | Yuan | H01L 27/1214 |
| 2020/0166811 | A1* | 5/2020 | Chen | G02F 1/136204 |

FOREIGN PATENT DOCUMENTS

| | | |
|---|---|---|
| CN | 106786463 A | 5/2017 |
| CN | 106959562 A | 7/2017 |
| CN | 107402464 A | 11/2017 |

* cited by examiner

ELECTROSTATIC DISCHARGING CIRCUIT AND DISPLAY PANEL

BACKGROUND

Technical Field

This disclosure relates to a technical field of a display, and more particularly to an electrostatic discharge circuit and a display panel.

Related Art

Liquid crystal display has many advantages, such as a slim body, power-saving and radiation-free, and is widely applied. The currently-available liquid crystal displays are mainly backlight liquid crystal display which comprises a liquid crystal panel and a backlight module. The work principle of the liquid crystal display is that the liquid crystal molecules are placed between two parallel glass substrates, and a drive voltage is applied to the two glass substrates to control the rotating directions of the liquid crystal molecules so as to refract the light from the backlight module to generate an image.

TFT-LCD (Thin Film Transistor-Liquid Crystal Display) has gradually occupied the dominant position in the display field due to its low power consumption, excellent image quality and high production yield. Similarly, the TFT-LCD comprises a liquid crystal panel and a backlight module. The liquid crystal panel comprises a CF substrate (Color Filter Substrate) and a TFT substrate (Thin Film Transistor Substrate). Transparent electrodes are provided on opposite inner sides of the substrates. A layer of liquid crystal (LC) is interposed between the two substrates.

However, when the voltage generated by an electrostatic discharge (referred to as ESD) exceeds a certain value, it may cause dielectric breakdown of an integrated circuit chip, meltdown of the wire, accelerated aging due to the increasing of the leakage current, and alternating of the electrical characteristics, etc. Hence, ESD protection is quite important.

SUMMARY

The technical problem to be solved by this disclosure is to provide an electrostatic discharge circuit having a reliable and effective protection circuit.

In addition, this disclosure further provides a display panel comprising the above-mentioned electrostatic discharge circuit.

The objective of this disclosure is achieved through the following technical solutions:

An electrostatic discharge circuit, comprising a first discharge unit and an associated discharge unit. An output terminal of the first discharge unit is coupled to a common terminal. A control terminal of the first discharge unit is coupled to a high voltage terminal or a low voltage terminal. An input terminal of the first discharge unit is coupled to an electrostatic input terminal. An input terminal of the associated discharge unit is coupled to the electrostatic input terminal. An output terminal of the associated discharge unit is coupled to the control terminal of the first discharge unit.

In one embodiment, the first discharge unit comprises a first electroconductive wire whose one end is coupled to the common terminal, and the common terminal is grounded. The required line width of the electroconductive wire used between the high voltage terminal (VGH) and the low voltage terminal (VGL) is relative small, which means that there is a relative large resistance. The discharged current is also relatively small, and the discharging capacity provided by the first discharge unit alone may not be sufficient. However, the first electroconductive wire is coupled to the ground (GND), and its line width is far greater than the line widths of the VGH and VGL. Hence, the current that can be discharged by the circuit with such configuration will be greater than that can be discharged by the conventional one, such that a better protective effect is achieved.

In one embodiment, the first discharge unit comprises a first electroconductive wire whose one end is coupled to the common terminal, the electrostatic discharge circuit is disposed on a display panel, and the common terminal is coupled to a common voltage terminal of the display panel. The required line width of the electroconductive wire used between the high voltage terminal (VGH) and the low voltage terminal (VGL) is small, which means that there is a relative large resistance. The discharged current is also relatively small, and the discharging capacity provided by the first discharge unit alone may not be sufficient. However, the first electroconductive wire is coupled to the common voltage terminal (VCOM), and its line width is far greater than the line widths of the VGH and VGL. Hence, the current that can be discharged by the circuit with such configuration will be greater than that can be discharged by the conventional one, such that a better protective effect is achieved.

In one embodiment, the first discharge unit comprises a first N-type transistor and a second P-type transistor. A source of the first N-type transistor is coupled to the common terminal, a gate of the first N-type transistor is coupled to the high voltage terminal or the low voltage terminal, and a drain of the first N-type transistor is coupled to the electrostatic input terminal. A source of the second P-type transistor is coupled to the common terminal, a gate of the second P-type transistor is coupled to the high voltage terminal or the low voltage terminal, and a drain of the second P-type transistor is coupled to the electrostatic input terminal. The sources of the first N-type transistor and the second P-type transistor are coupled to the common terminal (GND or VCOM). With the increase of line width, the discharged current of the electrostatic discharge is increased.

In one embodiment, the associated discharge unit comprises a second discharge unit and a third discharge unit. The second discharge unit comprises a first capacitor, the first terminal of the first capacitor is coupled to the electrostatic input terminal, and the second terminal of the first capacitor is coupled to the gate of the first N-type transistor. The third discharge unit comprises a second capacitor. A first terminal of the second capacitor is coupled to the electrostatic input terminal. A second terminal of the second capacitor is coupled to the gate of the second P-type transistor. According to the properties of the capacitor that can block a direct current but conducts an alternating current and can conduct a high-frequent current but blocks a low-frequent current and its coupling effect, when the voltage is between a range from VGL to VGH, the second discharge unit and the third discharge unit do not work.

In one embodiment, the second discharge unit comprises a third N-type transistor. A source of the third N-type transistor is coupled to the second terminal of the first capacitor, a gate of the third N-type transistor is coupled to the high voltage terminal, and a drain of the third N-type transistor is coupled to the low voltage terminal. The third discharge unit comprises a fourth P-type transistor. A source of the fourth P-type transistor is coupled to the second terminal of the second capacitor, a gate of the fourth P-type transistor is coupled to the low voltage terminal, and a drain of the fourth P-type transistor is coupled to the high voltage terminal. At the positive voltage, the third transistor, which is turned on, further completes the discharge function of the second discharge unit, and the potential of the second terminal of the first capacitor is pulled to be consistent with the VGL at the same time. In this manner, when the voltage is between a range from VGL to VGH, the third transistor cannot be turned on to discharge and affect the normal work of the protection circuit. At the negative voltage, the fourth transistor, which is turned on, further completes the discharge function of the third discharge unit, and the potential of the second terminal of the second capacitor is pulled to be consistent with the VGH at the same time. In this manner, when the voltage is between a range from VGL to VGH, the fourth transistor cannot be turned on to discharge and affect the normal work of the protection circuit.

In one embodiment, the second discharge unit comprises a third P-type transistor, and a source the third P-type transistor is coupled to the second terminal of the first transistor. A gate of the third P-type transistor is coupled to the high voltage terminal, a drain of the third P-type transistor is coupled to the low voltage terminal. The third discharge unit comprises a fourth N-type transistor. A source of the fourth N-type transistor is coupled to the second terminal of the second capacitor, a gate of the fourth N-type transistor is coupled to the low voltage terminal, and a drain of the fourth N-type transistor is coupled to the high voltage terminal. A form of configuration of The P-type transistor and the N-type transistor of the second discharge unit and the third discharge unit are provided.

In one embodiment, the first discharge unit comprises a first N-type transistor and a second P-type transistor. The source of the first N-type transistor is coupled to the common terminal, and the common terminal is grounded. The gate of the first N-type transistor is coupled to the high voltage terminal or the low voltage terminal. The drain of the first N-type transistor is coupled to the electrostatic input terminal. The source of the second P-type transistor is coupled to the common terminal, and the common terminal is grounded. The gate of the second P-type transistor is coupled to the high voltage terminal or low voltage terminal, and the drain of the second P-type transistor is coupled to the electrostatic input terminal. The associated discharge unit comprises the second discharge unit and third discharge unit. The second discharge unit comprises the first capacitor. The first terminal of the first capacitor is coupled to the electrostatic input terminal, and the second terminal of the first capacitor is coupled to the gate of the first N-type transistor. The third discharge unit comprises the second capacitor. The first terminal of the second capacitor is coupled to the electrostatic input terminal. The second terminal of the second capacitor is coupled to the gate of the second P-type transistor. The second discharge unit comprises the third N-type transistor, and the source of the third N-type transistor is coupled to the second terminal of the first capacitor. The gate of the third N-type transistor is coupled to the high voltage terminal. The drain of the third N-type transistor is coupled to the low voltage terminal. The third discharge unit comprises the fourth P-type transistor. The source of the fourth P-type transistor is coupled to the second terminal of the second capacitor. The gate of the fourth P-type transistor is coupled to the low voltage terminal. The drain of the fourth P-type transistor is coupled to the high voltage terminal. Here shows an implementation aspect of the electrostatic discharge circuit, and its clearly and specifically adopted electrical components and connection relationships.

In one embodiment, the first discharge unit comprises a first N-type transistor and a second P-type transistor. The source of the first N-type transistor is coupled to the common terminal, and the common terminal is grounded. The gate of the first N-type transistor is coupled to the high voltage terminal or the low voltage terminal. The drain of the first N-type transistor is coupled to the electrostatic input terminal. The source of the second P-type transistor is coupled to the common terminal, and the common terminal is grounded. The gate of the second P-type transistor is connected high voltage terminal or the low voltage terminal. The drain of the second P-type transistor is coupled to the electrostatic input terminal. The associated discharge unit comprises the second discharge unit and third discharge unit. The second discharge unit comprises the first capacitor. The first terminal of the first capacitor is coupled to the electrostatic input terminal. The second terminal of the first capacitor is coupled to the gate of the first N-type transistor. The third discharge unit comprises the second capacitor. The first terminal of the second capacitor is coupled to the electrostatic input terminal. The second terminal of the second capacitor is coupled to the gate of the second P-type transistor. The second discharge unit comprises the third N-type transistor. The source of the third N-type transistor is coupled to the second terminal of the first capacitor. The gate of the third N-type transistor is coupled to the high voltage terminal. The drain of the third N-type transistor is coupled to the low voltage terminal. The third discharge unit comprises the fourth P-type transistor. The source of the fourth P-type transistor is coupled to the second terminal of the second capacitor. The gate of the fourth P-type transistor is coupled to the low voltage terminal. The drain of the fourth P-type transistor is coupled to the high voltage terminal.

According to another aspect of this disclosure, this disclosure further provide a display panel. The electrostatic discharge circuit is disposed on a display panel. The electrostatic discharge circuit comprises a first discharge unit and an associated discharge unit. An output terminal of the first discharge unit is coupled to a common terminal. A control terminal of the first discharge unit is coupled to a high voltage terminal or a low voltage terminal. An input terminal of the first discharge unit is coupled to an electrostatic input terminal. An input terminal of the associated discharge unit is coupled to the electrostatic input terminal. An output terminal of the associated discharge unit is coupled to the control terminal of the first discharge unit. The first discharge unit comprises a first N-type transistor and a second P-type transistor. The source of the first N-type transistor is coupled to the common terminal. The common terminal is grounded, and the gate of the first N-type transistor is coupled to the high voltage terminal or the low voltage terminal. The drain of the first N-type transistor is coupled to the electrostatic input terminal. The source of the second P-type transistor is coupled to the common terminal, and the common terminal is grounded. The gate of the second P-type transistor is coupled to the high voltage terminal or low voltage terminal. The drain of the second P-type transistor is coupled to the electrostatic input terminal. The associated discharge unit comprises the second discharge unit and third discharge unit. The second discharge unit comprises the first capacitor. The first terminal of the first capacitor is coupled to the electrostatic input terminal. The second terminal of the first capacitor is coupled to the gate of the first N-type transistor. The third discharge unit comprises the second capacitor. The first terminal of the second capacitor is coupled to the electrostatic input terminal. The the second terminal of the second capacitor is coupled to the gate of the second P-type transistor. The second discharge unit comprises the third N-type transistor. The source of the third N-type transistor is coupled to the second terminal of the first capacitor. The gate of the third N-type transistor is coupled to the high voltage terminal. The drain of the third N-type transistor is coupled to the low voltage terminal. The third discharge unit comprises the fourth P-type transistor. The source of the fourth P-type transistor is coupled to the second terminal of the second capacitor. The gate of the fourth P-type transistor is coupled to the low voltage terminal. The drain of the fourth P-type transistor is coupled to the high voltage terminal.

According to still another aspect of this disclosure, this disclosure further provide a display panel. The display panel comprises a substrate, signal lines and electrostatic discharge circuit. A plurality of active switches are disposed on the substrate. The signal lines are disposed on the substrate and coupled to the active switches, and the signal lines comprise a plurality of scan lines and a plurality of data lines, and the data lines successively intersect the scan lines to form a plurality of pixel areas. The electrostatic discharge circuit is disposed on the substrate.

In one embodiment, the display panel further comprises a gate driving circuit and a source driving circuit. The gate driving circuit and the source driving circuit are disposed on the substrate.

In this disclosure, because the output terminal of the first discharge unit is coupled to the common terminal and the associated discharge unit works with the first discharge unit, the current paths of the ESD are increased, so that the discharging speed and capacity can be increased. A better protection effect on the display panel is achieved, and its lifetime is extended.

BRIEF DESCRIPTION OF THE DRAWINGS

The accompanying drawings are included to provide a further understanding of embodiments of the present application, which constitutes a part of the specification, illustrate embodiments of the present disclosure is used, together and explain the principles of the present disclosure with the description. Apparently, the drawings in the following description are only some embodiments of the present disclosure, those of ordinary skill in the art is concerned, without any creative effort, and may also obtain other drawings based on these drawings. In the drawings.

DETAILED DESCRIPTION OF THE INVENTION

Figure 1:
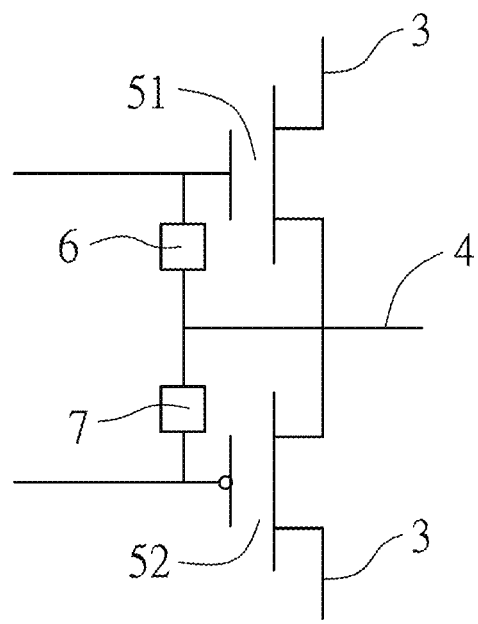
FIG. 1 is a schematic view showing an electrostatic discharge circuit of a display panel of the embodiment of this disclosure.

Specific structural and functional details disclosed herein are merely representative and are for purposes of describing example embodiments of the present invention. However, the present invention may be embodied in many alternate forms, and should not be interpreted as being limited to the embodiments set forth herein.

In the description of the present invention, it is to be understood that the term "center", "lateral", "upper", "lower", "left", "right", "vertical", "horizontal", "top", "bottom", "inner", "outer" and other indicated orientation or positional relationships are based on the location or position relationship shown in the drawings, and are for convenience of description of the present invention only and to simplify the description, and not indicate or imply that refers to devices or elements must have a specific orientation, the orientation of a particular configuration and operation, therefore, cannot be construed as limiting the present invention. In addition, the terms "first", "second" are used to indicate or imply relative importance or the number of technical features specified implicitly indicated the purpose of description and should not be understood. Thus, there is defined "first", "second" features may be explicitly or implicitly include one or more of the features. In the description of the present invention, unless otherwise specified, the meaning of "more" is two or more. Further, the term "comprising" and any variations thereof, are intended to cover non-exclusive inclusion.

In the description of the present invention, it is noted that, unless otherwise expressly specified or limited, the terms "mounted," "connected to", "connected" are to be broadly understood, for example, may be a fixed connection, may be a detachable connection, or integrally connected; may be a mechanical connector may be electrically connected; may be directly connected, can also be connected indirectly through intervening structures, it may be in communication the interior of the two elements. Those of ordinary skill in the art, be appreciated that the specific circumstances of the specific meanings in the present invention.

The terminology used herein is for describing particular embodiments only and is not intended to limit embodiments to an exemplary embodiment. Unless the context clearly indicates otherwise, singular forms as used herein, "a", "an" are intended to include the plural. It should also be understood that, as used herein the term "comprising" and/or "comprising," as used herein, specify the presence of stated features, integers, steps, operations, elements, and/or components, but do not preclude the presence or addition of one or more other features, integers, steps, operations, elements, components, and/or combinations thereof.

This disclosure will be further described in detail with reference to the accompanying drawings and specific embodiments below.

A schematic view of an electrostatic discharge circuit of the embodiment of this disclosure will be described below with reference to FIGS. 1 to 3.

Figure 4:
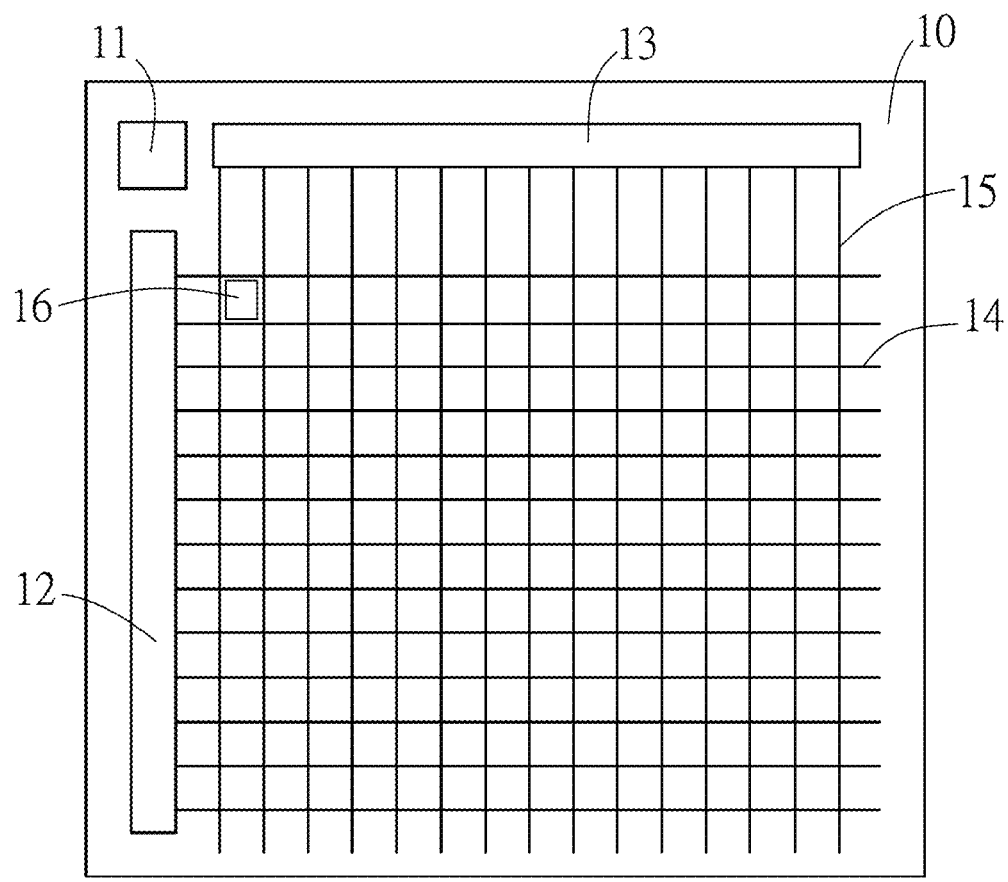
FIG. 4 is a schematic structure view showing a display panel of the embodiment of this disclosure.

As an embodiment of this disclosure, as shown in FIG. 1, an electrostatic discharge circuit 11 comprises a first discharge unit and an associated discharge unit. An output terminal of the first discharge unit is coupled to a common terminal 3. A control terminal of the first discharge unit is coupled to a high voltage terminal or a low voltage terminal, and an input terminal of the first discharge unit is coupled to an electrostatic input terminal 4. An input terminal of the associated discharge unit is coupled to the electrostatic input terminal 4. An output terminal of the associated discharge unit is coupled to the control terminal of the first discharge unit. Because the output terminal of the first discharge unit is coupled to the common terminal 3 and the associated discharge unit works with the first discharge unit, the current paths of the ESD are increased, so that the discharging speed and amount can be increased. A better protection effect on the display panel is achieved, and its lifetime is extended. As shown in FIG. 4, the display panel comprises a substrate 10, signal lines and the electrostatic discharge circuit 11. A plurality of active switches are disposed on the substrate 10. The signal lines are disposed on the substrate 10 and coupled to the active switches. The signal lines comprise a plurality of scan lines 14 and a plurality data lines 15. The data lines 15 successively intersect the scan lines 14 to form a plurality of pixel areas 16. The electrostatic discharge circuit 11, a gate driving circuit 12 and a source driving circuit 13 are disposed on the substrate 10. The horizontal disposed scan lines 14 and the vertical disposed data lines 15 are coupled and connected to their corresponding circuits, and the active switches may be, for example, thin film transistors. The high voltage terminal, the low voltage terminal, the electrostatic input terminal 4 and the common terminal 3 are coupled to components of the display panel.

Specifically, the first discharge unit comprises a first electroconductive wire whose one end is coupled to the common terminal 3, and the common terminal 3 is grounded. The required line width of the electroconductive wire used between the high voltage terminal (VGH) 1 and the low voltage terminal (VGL) 2 is small, which means that there is a relative large resistance. The discharged current is also relatively small, and the discharging capacity provided by the first discharge unit alone may not be sufficient. However, the first electroconductive wire is coupled to the ground (GND). Alternatively, the first electroconductive wire is coupled to the common voltage terminal (VCOM), and its line width is far greater than the line widths of the VGH and VGL. Hence, the current that can be discharged by the circuit with such configuration will be greater than that discharged by the original one, such that a better protective effect is achieved. The display panel comprises a gate integrated circuit. The high voltage terminal and the low voltage terminal are respectively coupled to the transistor turn-on voltage terminal and the transistor turn-off voltage terminal of the gate integrated circuit.

As another embodiment of this disclosure, an electrostatic discharge circuit 11 comprises a first discharge unit and an associated discharge unit. An output terminal of the first discharge unit is coupled to a common terminal 3. A control terminal of the first discharge unit is coupled to a high voltage terminal or a low voltage terminal, and an input terminal of the first discharge unit is coupled to an electrostatic input terminal 4. An input terminal of the associated discharge unit is coupled to the electrostatic input terminal 4. An output terminal of the associated discharge unit is coupled to the control terminal of the first discharge unit. Because the output terminal of the first discharge unit is coupled to the common terminal 3 and the associated discharge unit works with the first discharge unit, the current paths of the ESD are increased, such that the discharging speed and capacity can be increased. A better protection effect on the display panel is achieved, and its lifetime is extended. The first discharge unit comprises a first N-type transistor 51 and a second P-type transistor 52. A source of the first N-type transistor 51 is coupled to the common terminal 3, a gate of the first N-type transistor 51 is coupled to the high voltage terminal or the low voltage terminal, and a drain of the first N-type transistor 51 is coupled to the electrostatic input terminal 4. A source of the second P-type transistor 52 is coupled to the common terminal 3, a gate of the second P-type transistor 52 is coupled to the high voltage terminal or the low voltage terminal, and a drain of the second P-type transistor 52 is coupled to the electrostatic input terminal 4. The sources of the first N-type transistor 51 and the second P-type transistor 52 are coupled to the common terminal 3 (GND or VCOM). With the increase of line width, the discharged current of the electrostatic discharge is increased. The associated discharge unit comprises a second discharge unit 6 and a third discharge unit 7. The second discharge unit 6 comprises a first capacitor. The first terminal of the first capacitor is coupled to the electrostatic input terminal 4, and the second terminal of the first capacitor is coupled to the gate of the first N-type transistor 51. The third discharge unit 7 comprises a second capacitor 72. A first terminal of the second capacitor 72 is coupled to the electrostatic input terminal 4. A second terminal of the second capacitor 72 is coupled to the gate of the second P-type transistor 52. According to the properties of the capacitor that can block a direct current but conducts an alternating current and can conduct a high-frequency current but blocks a low-frequency current and its coupling effect, when the voltage is between a range from VGL to VGH, the second discharge unit 6 and the third discharge unit 7 do not work. Accordingly, when the input voltage of the PIN is between a range from VGL to VGH, this capacitor does not operate because the capacitor in the DC current can be considered as an open circuit. Whether a positive or negative high voltage is instantaneously applied to the electrostatic input 4, it can be respectively discharged by, in addition to the first discharge unit, the second discharge unit 6 and the third discharge unit 7.

As still another embodiment of this disclosure, an electrostatic discharge circuit 11 comprises a first discharge unit and an associated discharge unit. An output terminal of the first discharge unit is coupled to a common terminal 3. A control terminal of the first discharge unit is coupled to a high voltage terminal or a low voltage terminal, and an input terminal of the first discharge unit is coupled to an electrostatic input terminal 4. An input terminal of the associated discharge unit is coupled to the electrostatic input terminal 4. An output terminal of the associated discharge unit is coupled to the control terminal of the first discharge unit. The output terminal of the first discharge unit is coupled to the common terminal 3 and the associated discharge unit works with the first discharge unit. Hence, the current paths of ESD are increased, and the discharging speed and capacity can be increased A better protection effect on the display panel is achieved, and its lifetime is extended. The first discharge unit comprises a first N-type transistor 51 and a second P-type transistor 52. A source of the first N-type transistor 51 is coupled to the common terminal 3, a gate of the first N-type transistor 51 is coupled to the high voltage terminal or the low voltage terminal, and a drain of the first N-type transistor 51 is coupled to the electrostatic input terminal 4. A source of the second P-type transistor 52 is coupled to the common terminal 3, a gate of the second P-type transistor 52 is coupled to the high voltage terminal or the low voltage terminal, and a drain of the second P-type transistor 52 is coupled to the electrostatic input terminal 4. The sources of the first N-type transistor 51 and the second P-type transistor 52 are coupled to the common terminal 3 (GND or VCOM). With the increase of line width, the discharged current of the electrostatic discharge is increased. The associated discharge unit comprises a second discharge unit 6 and a third discharge unit 7, the second discharge unit 6 comprises a first capacitor and a third N-type transistor 61. The first terminal of the first capacitor is coupled to the electrostatic input terminal 4, and the second terminal of the first capacitor is coupled to the gate of the first N-type transistor 51. A source of the third N-type transistor 61 is coupled to the second terminal of the first capacitor, and the gate of the third N-type transistor 61 is coupled to the high voltage terminal, and the drain of the third N-type transistor 61 is coupled to the low voltage terminal. The third discharge unit 7 comprises the second capacitor 72 and a fourth P-type transistor 71. The first terminal of the second capacitor 72 is coupled to the electrostatic input terminal 4. The second terminal of the second capacitor 72 is coupled to the gate of the second P-type transistor 52. The source of the fourth P-type transistor 71 is coupled to the second terminal of the second capacitor 72, and the gate of the fourth P-type transistor 71 is coupled to the low voltage terminal, and the drain of the fourth P-type transistor is coupled to the high voltage terminal. According to the properties of the capacitor that can block a direct current but conducts an alternating current and can conduct a high-frequent current but blocks a low-frequent current and its coupling effect, when the voltage is between a range from VGL to VGH, the second discharge unit 6 and the third discharge unit 7 do not work. Hence, when the input voltage of the PIN is between a range from VGL to VGH, this capacitor and transistor do not operate because the capacitor in the DC current can be considered as an open circuit. Whether a positive or negative high voltage is instantaneously applied to the electrostatic input 4, it can be respectively discharged by, in addition to the first discharge unit, the second discharge unit 6 and the third discharge unit 7. At the positive voltage, the third transistor, which is turned on, further completes the discharge function of the second discharge unit 6, and the potential of the second terminal of the first capacitor is pulled to be consistent with the common terminal at the same time. In this manner, when the voltage is between a range from VGL to VGH, the third transistor cannot be turned on to discharge and affect the normal work of the protection circuit. At the negative voltage, the fourth transistor, which is turned on, further completes the discharge function of the third discharge unit 7, and the potential of the second terminal of the second capacitor 72 is pulled to be consistent with the common terminal at the same time. In this manner, when the voltage is between a range from VGL to VGH, the fourth transistor cannot be turned on to discharge and affect the normal work of the protection circuit.

Figure 2:
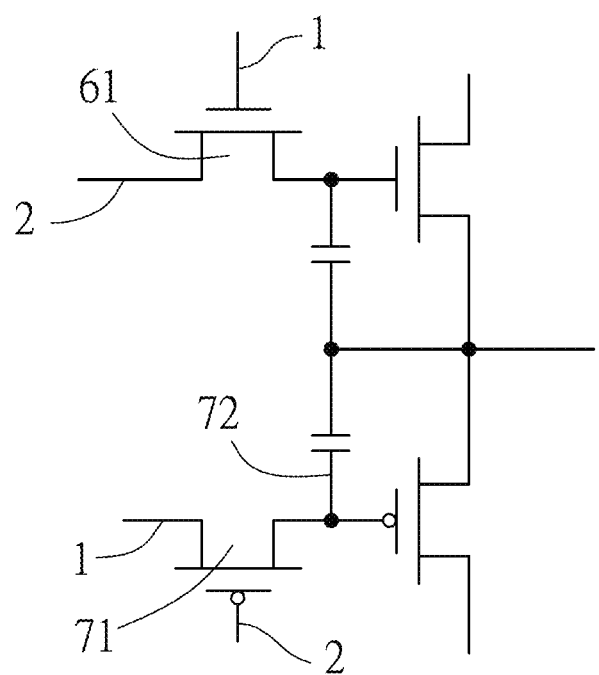
FIG. 2 is a schematic view showing an electrostatic discharge circuit of a display panel of the embodiment of this disclosure.
Figure 3:
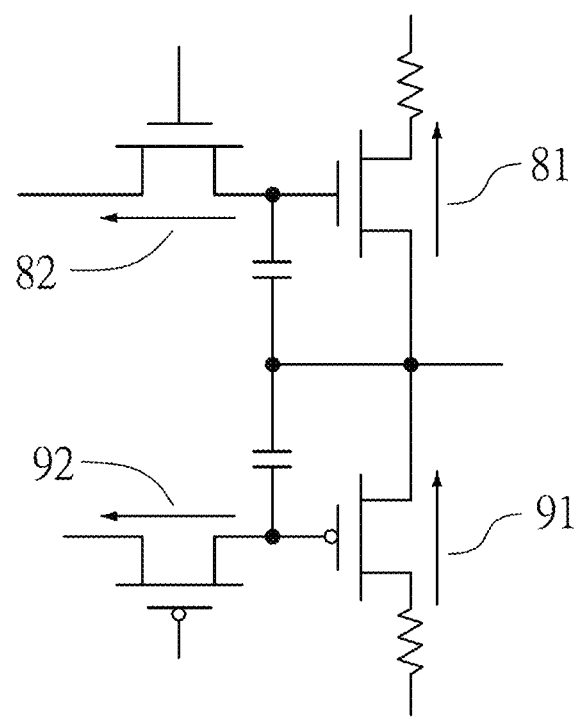
FIG. 3 is a schematic view showing an electrostatic discharge circuit of a display panel of the embodiment of this disclosure.

Specifically, as shown in FIGS. 2 and 3, and FIG. 3 can be considered as the actual equivalent circuit of FIG. 2. The common terminal 3 is grounded. When a positive high voltage instantaneously is applied to the PIN, due to the capacitive coupling effect, the second terminal of the first capacitor also becomes high at the same time, such that the first N-type transistor 51 is turned on and a first discharge current 81 is generated. At this time, the positive high voltage of the PIN can be discharged to GND. Meanwhile, the third N-type transistor 61 is also turned on, and a second discharge current 82 is generated. The second terminal of the first capacitor is pulled to the VGL by the third N-type transistor 61 at the same time to accelerate the discharge of PIN. Because the wiring of GND is usually thicker than that of VGL, the corresponding resistance is much lower than that of VGL. Hence, the second discharge current 82 is greater than the first discharge current 81. The discharged current is the sum of the first discharge current 81 and the first discharge current 81, which is greater faster than the total discharge current generated when the first discharge unit solely acts. It has a better and faster protection effect. When a negative high voltage is applied to the PIN, under the capacitive coupling effect, the second terminal of the second capacitor 72 also becomes low at the same time, such that the second P-type transistor 52 is turned on and a third discharge current 91 is generated. At this time, the negative high voltage applied to the PIN is discharged to the GND. Meanwhile, the fourth P-type transistor 71 is also turned on. A fourth discharge current 92 is generated. The second terminal of the second capacitor 72 is pulled to the VGL by the fourth P-type transistor 71 at the same time to accelerate the discharge of PIN. Because the wiring of GND is usually thicker than that of VGL, the corresponding resistance is much smaller than that of VGL, so the fourth discharge current 92 is greater than the first discharge current 91. The discharged current is the sum of the third discharge current 91 and the fourth discharge current 92, which is greater and faster than the total discharged current generated when the first discharge unit solely acts. It has a better and faster protection effect.

Of course, the second discharge unit 6 and the third discharge unit 7 may also be configured as follows. The second discharge unit 6 comprises a third P-type transistor. A source the third P-type transistor is coupled to the second terminal of the first transistor, a gate of the third P-type transistor is coupled to the high voltage terminal, and a drain of the third P-type transistor is coupled to the low voltage terminal. The third discharge unit 7 comprises a fourth N-type transistor. A source of the fourth N-type transistor is coupled to the second terminal of the second capacitor 72, a gate of the fourth N-type transistor is coupled to the low voltage terminal, and a drain of the fourth N-type transistor is coupled to the high voltage terminal.

It should be noted that, in the above embodiments, the material of the substrate 10 can be selected from the group consisting of glass, plastic and the likes.

In the above embodiments, the display panel comprises a liquid crystal panel, an OLED (Organic Light-Emitting Diode) panel, a QLED (Quantum Dot Light Emitting Diodes) panel, a curved panel, a plasma panel and the likes. Taking a liquid crystal panel as an example, the liquid crystal panel comprises a TFT substrate (Thin Film Transistor Substrate) and a CF substrate (Color Filter Substrate). The TFT substrate is disposed opposite to the CF substrate, and liquid crystal and a photo spacer (PS) are disposed between the TFT substrate and the CF substrate. A thin film transistor (TFT) is disposed at the TFT substrate, and a color filter layer is disposed at the CF substrate.

In the above embodiments, the CF substrate can comprise a TFT array. The color filter and the TFT array can be formed on the same substrate 10. The TFT substrate can comprise color filter layer.

In the above embodiments, the display panel of this disclosure can be a curved panel.

Figure 5:
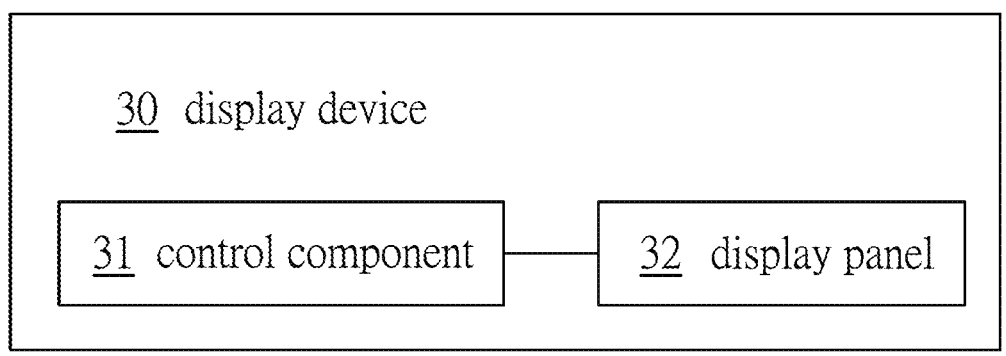
FIG. 5 is a schematic structure view showing a display device of the embodiment of this disclosure.

Referring to FIG. 5, this implementation method discloses a display device 30. The display device 30 comprises a control component 31, and a display panel 32 of this disclosure, and the display panel is taken as an example to be described in detail hereinabove. It should be noted that the above-mentioned description of the display panel structure is also applicable to the display device in the embodiment of this disclosure. When the display device of the embodiment of this disclosure is a liquid crystal display, the liquid crystal display comprises a backlight module, and the backlight module serves as a light source for supplying the light source with the adequate brightness and uniform distribution. The backlight module of this embodiment may pertain to a front lighting type, and may also pertain to a backlight type. It should be noted that the backlight module of this embodiment is not limited thereto.

The above contents with the specific embodiments of the present invention is further made to the detailed description, and specific embodiments of the present invention should not be considered limited to these descriptions. Those of ordinary skill in the art for the present invention, without departing from the spirit of the present invention, can make various simple deduction or replacement, and should be deemed to belong to the scope of the present invention.

What is claimed is:

1. An electrostatic discharge circuit, comprising:
a first discharge unit, wherein an output terminal of the first discharge unit is coupled to a common terminal, a control terminal of the first discharge unit is coupled to a high voltage terminal or a low voltage terminal, an input terminal of the first discharge unit is coupled to an electrostatic input terminal; and
an associated discharge unit, wherein an input terminal of the associated discharge unit is coupled to the electrostatic input terminal, an output terminal of the associated discharge unit is coupled to the control terminal of the first discharge unit,
wherein the first discharge unit comprises a first N-type transistor and a second P-type transistor, and a source of the first N-type transistor is coupled to the common terminal, a gate of the first N-type transistor is coupled to the high voltage terminal or the low voltage terminal, a drain of the first N-type transistor is coupled to the electrostatic input terminal, a source of the second P-type transistor is coupled to the common terminal, a gate of the second P-type transistor is coupled to the high voltage terminal or the low voltage terminal, and a drain of the second P-type transistor is coupled to the electrostatic input terminal,
wherein the associated discharge unit comprises a second discharge unit and a third discharge unit, the second discharge unit comprises a first capacitor, a first terminal of the first capacitor is coupled to the electrostatic input terminal, and a second terminal of the first capacitor is coupled to the gate of the first N-type transistor, the third discharge unit comprises a second capacitor, a first terminal of the second capacitor is coupled to the electrostatic input terminal, a second terminal of the second capacitor is coupled to the gate of the second P-type transistor.

2. The electrostatic discharge circuit according to claim 1, wherein the first discharge unit comprises a first electroconductive wire whose one end is coupled to the common terminal, and the common terminal is grounded.

3. The electrostatic discharge circuit according to claim 1, wherein the first discharge unit comprises the first electroconductive wire whose one end is coupled to the common terminal, the electrostatic discharge circuit is disposed on a display panel, and the common terminal is coupled to a common voltage terminal of the display panel.

4. The electrostatic discharge circuit according to claim 1, wherein the second discharge unit comprises a third N-type transistor, and a source of the third N-type transistor is coupled to the second terminal of the first capacitor, a gate of the third N-type transistor is coupled to the high voltage terminal, and a drain of the third N-type transistor is coupled to the low voltage terminal, the third discharge unit comprises a fourth P-type transistor, and a source of the fourth P-type transistor is coupled to the second terminal of the second capacitor, a gate of the fourth P-type transistor is coupled to the low voltage terminal, and a drain of the fourth P-type transistor is coupled to the high voltage terminal.

5. The electrostatic discharge circuit according to claim 4, wherein
the first discharge unit comprises a first N-type transistor and a second P-type transistor, and the source of the first N-type transistor is coupled to the common terminal, and the common terminal is grounded, and the gate of the first N-type transistor is coupled to the high voltage terminal or the low voltage terminal, and the drain of the first N-type transistor is coupled to the electrostatic input terminal, and the source of the second P-type transistor is coupled to the common terminal, and the common terminal is grounded, and the gate of the second P-type transistor is coupled to the high voltage terminal or low voltage terminal, and the drain of the second P-type transistor is coupled to the electrostatic input terminal;
the associated discharge unit comprises the second discharge unit and third discharge unit, and the second discharge unit comprises the first capacitor, and a first terminal of the first capacitor is coupled to the electrostatic input terminal, and a second terminal of the first capacitor is coupled to the gate of the first N-type transistor, the third discharge unit comprises the second capacitor, the first terminal of the second capacitor is coupled to the electrostatic input terminal, and the second terminal of the second capacitor is coupled to the gate of the second P-type transistor;
the second discharge unit comprises the third N-type transistor, and the source of the third N-type transistor is coupled to the second terminal of the first capacitor, and the gate of the third N-type transistor is coupled to the high voltage terminal, and the drain of the third N-type transistor is coupled to the low voltage terminal, the third discharge unit comprises the fourth P-type transistor, and the source of the fourth P-type transistor is coupled to the second terminal of the second capacitor, and the gate of the fourth P-type transistor is coupled to the low voltage terminal, and the drain of the fourth P-type transistor is coupled to the high voltage terminal.

6. The electrostatic discharge circuit according to claim 1, wherein the second discharge unit comprises a third P-type transistor, and a source the third P-type transistor is coupled to the second terminal of the first transistor, and a gate of the third P-type transistor is coupled to the high voltage terminal, and a drain of the third P-type transistor is coupled to the low voltage terminal, the third discharge unit comprises a fourth N-type transistor, and a source of the fourth N-type transistor is coupled to the second terminal of the second capacitor, and a gate of the fourth N-type transistor is coupled to the low voltage terminal, and a drain of the fourth N-type transistor is coupled to the high voltage terminal.

7. The electrostatic discharge circuit according to claim 6, wherein
the first discharge unit comprises a first N-type transistor and a second P-type transistor, and the source of the first N-type transistor is coupled to the common terminal, and the common terminal is grounded, and the gate of the first N-type transistor is coupled to the high voltage terminal or the low voltage terminal, and the drain of the first N-type transistor is coupled to the electrostatic input terminal, and the source of the second P-type transistor is coupled to the common terminal, and the common terminal is grounded, and the gate of the second P-type transistor is connected high voltage terminal or the low voltage terminal, and the drain of the second P-type transistor is coupled to the electrostatic input terminal;

the associated discharge unit comprises the second discharge unit and the third discharge unit, and the second discharge unit comprises the first capacitor, and a first terminal of the first capacitor is coupled to the electrostatic input terminal, and a second terminal of the first capacitor is coupled to the gate of the first N-type transistor; the third discharge unit comprises second capacitor, and the first terminal of the second capacitor is coupled to the electrostatic input terminal, and the second terminal of the second capacitor is coupled to the gate of the second P-type transistor;

the second discharge unit comprises the third P-type transistor, and the source of the third P-type transistor is coupled to the second terminal of the first capacitor, and the gate of the third P-type transistor is coupled to the high voltage terminal, and the drain of the third P-type transistor is coupled to the low voltage terminal; and the third discharge unit comprises the fourth N-type transistor, and the source of the fourth N-type transistor is coupled to the second terminal of the second capacitor, and the gate of the fourth N-type transistor is coupled to the low voltage terminal, and the drain of the fourth N-type transistor is coupled to the high voltage terminal.

8. A display panel, comprising:
a substrate, wherein a plurality of active switches are disposed on the substrate;
signal lines, wherein the gate driving circuit and the source driving circuit are disposed on the substrate and coupled to the active switches, wherein the signal lines comprise a plurality of scan lines and a plurality of data lines, and the data lines successively intersect the scan lines to form multiple pixel areas; and
the electrostatic discharge circuit according to claim 1;
wherein the electrostatic discharge circuit is disposed on the substrate.

9. The display panel according to claim 8, further comprising:
a gate driving circuit and a source driving circuit, wherein the gate driving circuit and the source driving circuit are disposed on the substrate.

10. The display panel according to claim 8, wherein the first discharge unit comprises a first electroconductive wire whose one end is coupled to the common terminal, and the common terminal is grounded.

11. The display panel according to claim 8, wherein the first discharge unit comprises a first electroconductive wire whose one end is coupled to the common terminal, and the electrostatic discharge circuit is disposed on a display panel, and the common terminal is coupled to a common voltage terminal of the display panel.

12. The display panel according to claim 8, wherein the second discharge unit comprises a third N-type transistor, and the source of the third N-type transistor is coupled to the second terminal of the first capacitor, and the gate of the third N-type transistor is coupled to the high voltage terminal, and the drain of the third N-type transistor is coupled to the low voltage terminal; the third discharge unit comprises a fourth P-type transistor, and the source of the fourth P-type transistor is coupled to the second terminal of the second capacitor, and the gate of the fourth P-type transistor is coupled to the low voltage terminal, and the drain of the fourth P-type transistor is coupled to the high voltage terminal.

13. The display panel according to claim 8, wherein the second discharge unit comprises a third P-type transistor, and the source of the third P-type transistor is coupled to the second terminal of the first capacitor, and the gate of the third P-type transistor is coupled to the high voltage terminal, and the drain of the third P-type transistor is coupled to the low voltage terminal, and the third discharge unit comprises a fourth N-type transistor, and the source of the fourth N-type transistor is coupled to the second terminal of the second capacitor, and the gate of the fourth N-type transistor is coupled to the low voltage terminal, and the drain of the fourth N-type transistor is coupled to the high voltage terminal.

14. An electrostatic discharge circuit, comprising:
a first discharge unit, wherein an output terminal of the first discharge unit is coupled to a common terminal, a control terminal of the first discharge unit is coupled to a high voltage terminal or a low voltage terminal, an input terminal of the first discharge unit is coupled to an electrostatic input terminal; and
an associated discharge unit, wherein an input terminal of the associated discharge unit is coupled to the electrostatic input terminal, an output terminal of the associated discharge unit is coupled to the control terminal of the first discharge unit;
wherein the first discharge unit comprises a first N-type transistor and a second P-type transistor, and a source of the first N-type transistor is coupled to the common terminal, and the common terminal is grounded, and the gate of the first N-type transistor is coupled to the high voltage terminal or the low voltage terminal, and the drain of the first N-type transistor is coupled to the electrostatic input terminal, and a source of the second P-type transistor is coupled to the common terminal, and the common terminal is grounded, and the gate of the second P-type transistor is coupled to the high voltage terminal or the low voltage terminal, and a drain of the second P-type transistor is coupled to the electrostatic input terminal;
the associated discharge unit comprises a second discharge unit and a third discharge unit, the second discharge unit comprises a first capacitor, a first terminal of the first capacitor is coupled to the electrostatic input terminal, and a second terminal of the first capacitor is coupled to the gate of the first N-type transistor, the third discharge unit comprises a second capacitor, a first terminal of the second capacitor is coupled to the electrostatic input terminal, a second terminal of the second capacitor is coupled to the gate of the second P-type transistor;
the second discharge unit comprises a third N-type transistor, and a source of the third N-type transistor is coupled to the second terminal of the first capacitor, a gate of the third N-type transistor is coupled to the high voltage terminal, and a drain of the third N-type transistor is coupled to the low voltage terminal, the third discharge unit comprises a fourth P-type transistor, and a source of the fourth P-type transistor is coupled to the second terminal of the second capacitor, a gate of the fourth P-type transistor is coupled to the low voltage terminal, and a drain of the fourth P-type transistor is coupled to the high voltage terminal.

15. The electrostatic discharge circuit according to claim 14, wherein the first discharge unit comprises a first electroconductive wire whose one end is coupled to the common terminal, and the common terminal is grounded.

16. The electrostatic discharge circuit according to claim 14, wherein the first discharge unit comprises a first electroconductive wire whose one end is coupled to the common terminal, the electrostatic discharge circuit is disposed on a display panel, and the common terminal is coupled to a common voltage terminal of the display panel.

* * * * *